3,063,910
METHOD OF PRODUCING L-MALIC ACID BY FERMENTATION
Shigeo Abe and Akira Furuya, Tokyo, Takeshi Saito, Sagamigahara-shi, and Ken'ichiro Takayama, Tokyo, Japan, assignors to Kyowa Hakko Kogyo Co., Ltd., Tokyo, Japan, a corporation of Japan
No Drawing. Filed Feb. 3, 1960, Ser. No. 6,353
9 Claims. (Cl. 195—36)

This invention relates to a method for the production of l-malic acid by fermentation. More particularly it is concerned with a new method for the production of l-malic acid which comprises cultivating a particular strain in a liquid or solid culture medium under aerobic conditions and then recovering the so-produced l-malic acid from the fermentation broth. L-malic acid is used in the manufacture of jelly and as an acidulent for bottled beverages or as an emulsifier for the manufacture of margarine and mayonnaise. The range of its use is ever increasing.

Heretofore, l-malic acid has been synthesized according to chemical processes or obtained by extraction from fruits; the fermentative production of l-malic acid has neither been known nor practiced.

It has now been found that a substantial amount of l-malic acid can be accumulated in a culture medium by cultivating a strain of the species *Aspergillus parasiticus* Speare, *Aspergillus flavus* Link and *Aspergillus oryzae* (Ahlburg) Cohn. These are the known species of microorganism, cultures of which are available in public culture collections and which may be isolated from natural materials, and identified by published descriptions. Some of the strains which characteristically have high activity for producing l-malic acid are listed below.

(1) *Aspergillus parasiticus* Speare: Kyowa A–237 (ATCC No. 13696), QM No. 6736 (NRRL 465), and NI No. 5307
(2) *Aspergillus flavus* Link: Kyowa A–114 (ATCC No. 13697), Kyowa A–57 (ATCC No. 13698), IFO No. 5839, and NHL No. 5020
(3) *Aspergillus oryzae* (Ahlburg) Cohn: QM No. 82i In the above list, abbreviation is as follows:

ATCC—American Type Culture Collection, Washington, D.C.
QM—Headquarters Quartermaster Research and Development Command, Quartermaster Research and Development Center, U.S. Army
NRRL—Northern Regional Research Laboratory of the Department of Agriculture, Peoria
NI—Nagao Institute, Tokyo
IFO—Institute of Fermentation, Osaka
NHL—National Hygienic Laboratory, Tokyo
Kyowa—Kyowa Hakko Kogyo Co., Ltd.

In order to carry out the present invention, one of the above strains is cultivated in a liquid or solid culture medium. Glucose, sucrose or molasses, in an amount of from 10 to 15%, on the total sugar basis, can be employed as carbon source. Similarly, fructose, maltose, mannose, galactose, sorbose, xylose, starch, sorbitol, glycerol, and so forth may also be used as carbon source. Peptone, ammonium chloride, ammonium nitrate, urea, ammonium sulfate or sodium nitrate can be used in an amount of from 0.2 to 1.5% as nitrogen source. In addition to the carbon and nitrogen sources, 0.015% of potassium dihydrogen phosphate ($KH_2PO_4$), 0.015% of dipotassium hydrogen phosphate ($K_2HPO_4$), 0.01% of magnesium sulfate ($MgSO_4 \cdot 7H_2O$), 0.01% of calcium chloride ($CaCl_2 \cdot 2H_2O$), as well as 5 mgr./l. each of ferrous sulfate ($FeSO_4 \cdot 7H_2O$) and sodium chloride are added to the culture medium. Further, 0.5 to 10% of organic acid, such as pyruvic and fumaric acid, or the salts thereof may be advantageously used together with the carbon source as fermentation accelerator. Additionally, 1 to 10% of sterile calcium carbonate or magnesium carbonate may be added. The preferred pH of the thus formulated culture medium is within the range of from 5.0 to 7.5. According to the present invention, the cultivation is preferably carried out at a temperature of from 25° to 30° C. for about 5 to 7 days in a submerged, aerated culture, or for about 2 to 3 weeks in a surfacial, solid culture.

After cultivation is completed, the mycelium is separated from the broth, containing l-malic acid, by filtration. The filtrate is then concentrated in vacuo, thereby yielding l-malic acid salt, such as calcium salt or magnesium salt.

The following examples show how the invention is carried out, but the invention is not to be construed as limited thereto. In the examples, all percentages are by weight per volume, i.e. grams per cubic centimeter.

EXAMPLE 1

One liter (l.) of a culture solution is prepared, the solution consisting of 10% glucose, 0.6% peptone, 0.015% $KH_2PO_4$, 0.015% $K_2HPO_4$, 0.01% $MgSO_4 \cdot 7H_2O$, 0.01% $CaCl_2 \cdot 2H_2O$, 5 milligrams (mgr.) of NaCl, 5 mgr. of $FeSO_4 \cdot 7H_2O$, and the balance of distilled water. This solution is divided into 30 milliliter portions each of which is placed into a separate 250 ml.-volume, shaking flask and then sterilized by heating under pressure at 120° C. for 15 minutes. 4% of $CaCO_3$, which is separately sterilized by dry heating, is added to each of the flasks. Thereafter a microorganism listed in Table 1 is inoculated in the culture solution. After inoculation, cultivation is carried out at 28° C. for 7 days, using a rotary shaker at 200 r.p.m. Table 1 shows the l-malic acid-producing activities of various organisms as evidenced by the procedure of the instant example.

Table 1

| Strain used | Number of experiments | pH of broth | l-malic acid formed, mgr./ml. |
|---|---|---|---|
| *Asp. flavus* Kyowa A–114 (ATCC No. 13697) | 2 | 6.2 | 32.6 |
| *Asp. flavus* Kyowa A–57 (ATCC No. 13698) | 1 | 5.6 | 29.6 |
| *Asp. flavus* IFO No. 5839 | 7 | 5.8 | 27.8 |
| *Asp. flavus* NHL No. 5020 | 1 | 5.8 | 21.8 |
| *Asp. parasiticus* Kyowa A–237 (ATCC No. 13696) | 1 | 5.8 | 24.2 |
| *Asp. parasiticus* NI No. 5307 | 3 | 5.4 | 26.2 |
| *Asp. parasiticus* QM No. 6736 (NRRL No. 465) | 1 | 6.0 | 26.2 |
| *Asp. oryzae* QM No. 82i | 3 | 5.9 | 24.6 |

EXAMPLE 2

Cultivation using a strain *Aspergillus flavus* Kyowa A–114 (ATCC No. 13697) was carried out in the same manner as in Example 1. With the exception that the peptone in the culture solution of Example 1 was replaced with from 0.2 to 0.6% of $NH_4Cl$, $NH_4NO_3$, $(NH_2)_2CO$, $(NH_4)_2SO_4$ or $NaNO_3$. After cultivation for from 5 to 9 days, the fermentation broth has the analytical value as set forth in Table 2.

Table 2

| Type of nitrogen source | Concentration of nitrogen source, percent | Period for the cultivation, days | pH of broth | l-malic acid formed, mgr./ml. |
|---|---|---|---|---|
| $NH_4Cl$ | 0.4 | 7 | 6.1 | 18.6 |
| $NH_4Cl$ | 0.4 | 9 | 6.1 | 26.0 |
| $NH_4NO_3$ | 0.3 | 7 | 6.6 | 19.0 |
| $NH_4NO_2$ | 0.3 | 9 | 6.5 | 19.6 |
| $(NH_2)_2CO$ | 0.2 | 7 | 6.2 | 23.2 |
| $(NH_2)_2CO$ | 0.2 | 9 | 5.7 | 42.0 |
| $(NH_4)_2SO_4$ | 0.2 | 7 | 6.0 | 30.4 |
| $(NH_4)_2SO_4$ | 0.2 | 9 | 6.0 | 38.2 |
| $NaNO_3$ | 0.6 | 5 | 6.6 | 23.6 |
| $NaNO_3$ | 0.6 | 7 | 7.0 | 26.6 |

EXAMPLE 3

The same culture medium is employed as that of Example 1, with the exception that 0.2% of $(NH_4)_2SO_4$ is used instead of peptone, and $CaCO_3$ (varying from zero to 10%) is added. After inoculation with *Aspergillus flavus* Kyowa A-114 (ATCC No. 13697), cultivation is carried out as in Example 1 for a period of 9 days. At the end of said period, analysis of the broth shows the results set forth in Table 3.

Table 3

| Additive, percent | | pH of broth | Mycelium, ml./10ml. | Residual sugar, mgr./ml. | l-malic acid, mgr./ml. |
|---|---|---|---|---|---|
| $CaCO_3$ | 0 | 4.1 | 0.4 | 73.4 | 2.2 |
| | 2 | 5.2 | 2.3 | 33.4 | 19.4 |
| | 4 | 5.4 | 2.2 | 2.5 | 40.0 |
| | 6 | 5.3 | 2.2 | 4.1 | 53.6 |
| | 8 | 5.4 | 2.2 | 2.5 | 56.6 |
| | 10 | 5.4 | 2.2 | 2.3 | 58.4 |
| $MgCO_3$ | 4 | 6.4 | 2.2 | 4.6 | 37.4 |
| | 6 | 6.8 | 2.2 | 4.1 | 48.8 |

EXAMPLE 4

The same culture medium as specified in Example 3 is used with the exception that 6% of $CaCO_3$ is employed and 10% on the total sugar basis of one of various sugars (sucrose, fructose, maltose, mannose, galactose, sorbose, xylose, starch, cane-molasses, sorbitol and glycerol) is used instead of glucose. Cultivation is carried out as in Example 3. After 8 days, the fermentation broth is characterized by the results set forth in Table 4.

Table 4

| Sugar used | pH of broth | l-malic acid formed, mgr./ml. |
|---|---|---|
| Sucrose | 5.6 | 35.2 |
| Fructose | 5.8 | 34.0 |
| Maltose | 5.4 | 40.2 |
| Mannose | 5.8 | 26.0 |
| Galactose | 5.9 | 24.0 |
| Sorbose | 6.1 | 6.8 |
| Xylose | 5.9 | 19.4 |
| Starch | 5.8 | 24.4 |
| Cane-molasses | 5.8 | 30.6 |
| Sorbitol | 5.7 | 36.2 |
| Glycerol | 5.7 | 35.4 |

EXAMPLE 5

A culture medium is prepared by using 0.2% of $(NH_4)_2SO_4$ instead of the peptone used in the culture of Example 1 and adding 6% of $CaCO_3$ together with various metallic cations as listed in Table 5. Cultivation using the thus prepared culture medium is carried out for 9 days.

Table 5

| Type of cation | Concentration of cation, mgr./l. | pH of broth | l-malic acid, mgr./ml. |
|---|---|---|---|
| $Fe^{++}$ | 5 | 6.2 | 37.0 |
| $Fe^{++}$ | 50 | 6.25 | 36.2 |
| $Fe^{++}$ | 500 | 6.4 | 44.4 |
| $Mn^{++}$ | 0.4 | 6.35 | 37.8 |
| $Mn^{++}$ | 4.0 | 6.30 | 36.0 |
| $Mn^{++}$ | 40 | 6.00 | 55.2 |
| $Al^{+++}$ | 0.4 | 6.15 | 40.2 |
| $Al^{+++}$ | 4.0 | 6.10 | 38.3 |
| $Al^{+++}$ | 40 | 6.05 | 52.2 |
| $Cr^{+++}$ | 0.5 | 6.05 | 50.7 |
| $Cr^{+++}$ | 5.0 | 6.15 | 39.3 |
| $Cr^{+++}$ | 50 | 6.20 | 43.2 |

NOTE.—$Fe^{++}$ is provided in the form of $FeSO_4 \cdot 7H_2O$; $Mn^{++}$ is provided in the form of $MnCl_2 \cdot 4H_2O$; $Al^{+++}$ is provided in the form of $Al_2(SO_4)_3 \cdot 18H_2O$; $Cr^{+++}$ is provided in the form of $K_2CrO_7$.

EXAMPLE 6

A culture medium is prepared using 0.2% of $(NH_4)_2SO_4$ and 10% of sucrose, respectively, instead of peptone and glucose used in the culture solution of Example 1. Ten liters of the culture medium is supplemented with 4% of $CaCO_3$ and then inoculated with the microorganism of a strain *Aspergillus parasiticus* Speare QM No. 6736 (NRRL 465). Then cultivation is carried out at 28° C. under the conditions of aeration and agitation. On the second and third day, 3% $CaCO_3$ is added portionwise to the culture in order to maintain a pH of from 5.0 to 7.0. After 5 days, the fermentation broth is found to have the analytical values: pH 5.3; residual sugar 3.2 mgr./ml.; mycelium 2 mgr./10 ml.; l-malic acid 53.6 mgr./ml. After filtering the mycelium off, the filtrate is concentrated at 60° to 70° C. in vacuo. The resulting condensate is allowed to stand overnight, whereby 843 gr. of calcium l-malate is obtained. The calcium salt corresponds to 498 gr. of l-malic acid.

EXAMPLE 7

To 10 l. of a culture solution which is prepared using 0.2% $(NH_4)_2SO_4$ together with 6% $CaCO_3$ instead of peptone in the culture solution of Example I, the microorganism of a strain *Aspergillus flavus* Kyowa A-114 (ATCC No. 13697) is inoculated. Cultivation is carried out at 28° C. under aerobic conditions of aeration and agitation for 25 days, whereby a fermentation broth having a pH of 5.4, a residual sugar content of 4.0 mgr./ml., mycelium content of 2.1 ml./10 ml. and a l-malic acid content of 60 mgr./ml. is obtained. By filtering the mycelium from the broth and condensing the filtrate in vacuo, 961 gr. of calcium l-malate is obtained, which corresponds to 570 gr. of l-malic acid.

EXAMPLE 8

The same culture medium as in Example 1 is used, with the exception that the medium also contains from 1 to 2% of an organic acid. Cultivation is carried out in the way described in Example 3. After cultivation for 7 days, the fermentation broth is characterized by the following data:

Table 6

| Organic acid used | Concentration, mol/ml. | pH of broth | l-malic acid, mgr./ml. |
|---|---|---|---|
| Fumaric acid | 0.1 | 5.8 | 46.2 |
| Do | 0.1 | 5.7 | 51.2 |
| Pyruvic acid | 0.1 | 5.5 | 40.0 |
| None (as control) | | 5.6 | 34.0 |

It is thought that the invention and its advantages will be understood from the foregoing description, and it is apparent that various changes may be made in the process without departing from the spirit and scope of

What is claimed is:

1. A method of producing l-malic acid by fermentation which comprises cultivating under aerobic conditions at a temperature from 20° to 30° C. *Aspergillus parasiticus* in a culture medium containing assimilable sources of carbohydrate, nitrogen and inorganic salts, maintaining the pH of the culture medium within a range of from 5.0 to 7.5 by the presence of from 1 to 10% (weight/volume) of at least one member selected from the group consisting of calcium carbonate and magnesium carbonate in the medium, whereby a substantial amount of l-malic acid is produced in the culture medium, and recovering the l-malic acid from said culture medium.

2. A method of producing l-malic acid by fermentation which comprises cultivating under aerobic conditions at a temperature from 20° to 30° C. *Aspergillus oryzae* in a culture medium containing assimilable sources of carbohydrate, nitrogen and inorganic salts, maintaining the pH of the culture medium within a range of from 5.0 to 7.5 by the presence of from 1 to 10% (weight/volume) of at least one member selected from the group consisting of calcium carbonate and magnesium carbonate in the medium, whereby a substantial amount of l-malic acid is produced in the culture medium, and recovering the l-malic acid from said culture medium.

3. A method of producing l-malic acid by fermentation which comprises cultivating under aerobic conditions at a temperature from 20° to 30° C. an l-malic acid-producing strain af *Aspergillus parasiticus* Speare (ATCC No. 13696) in a culture medium containing assimilable sources of carbohydrate, nitrogen and inorganic salts, maintaining the pH of the culture medium within a range of from 5.0 to 7.5 by the presence of from 1 to 10% (weight/volume) of at least one member selected from the group consisting of calcium carbonate and magnesium carbonate in the medium, whereby a substantial amount of l-malic acid is produced in the culture medium, and recovering the l-malic acid from said culture medium.

4. A method of producing l-malic acid by fermentation which comprises cultivating under aerobic conditions at a temperature from 20° to 30° C. an l-malic acid-producing strain of *Aspergillus oryzae* (Ahlburg) Cohn in a culture medium containing assimilable sources of carbohydrate, nitrogen and inorganic salts, maintaining the pH of the culture medium within a range of from 5.0 to 7.5 by the presence of from 1 to 10% (weight/volume) of at least one member selected from the group consisting of calcium carbonate and magnesium carbonate in the medium, whereby a substantial amount of l-malic acid is produced in the culture medium, and recovering the l-malic acid from said culture medium.

5. A method according to claim 1 wherein the culture medium contains as carbon source at least one member selected from the group consisting of glucose, sucrose, fructose, maltose, mannose, galactose, sorbose, xylose, starch, molasses, sorbitol and glycerol.

6. A method according to claim 5 wherein the culture medium also contains as fermentation accelerator at least one of the members selected from the group consisting of pyruvic acid, fumaric acid and the salts thereof, together with the carbon source.

7. A method according to claim 1 wherein the culture medium contains as nitrogen source at least one member selected from the group consisting of peptone, urea, ammonium sulfate, ammonium chloride, ammonium nitrate and sodium nitrate.

8. A method according to claim 1 wherein the culture medium is an aqueous solution which contains at least one metallic cation selected from the group consisting of $Fe^{++}$, $Mn^{++}$, $Al^{+++}$ and $Cr^{+++}$.

9. A method according to claim 1 wherein the culture medium is a solid material which contains at least one metallic cation selected from the group consisting of $Fe^{++}$, $Mn^{++}$, $Al^{+++}$ and $Cr^{+++}$.

References Cited in the file of this patent

Chemistry and Industry, vol. 55 (1936), article by Yuill, pp. 155 TPIS 63.

Prescott and Dunn: "Industrial Microbiology," 3rd Edition, 1959, pp. 565, 567, 569. QR 151 P7.

Krebs article in the Biochemical Journal, vol. 54, pp. 78–82, pub. 1953. Cambridge University Press. London. QP 501 B47.

Scott et al.: Article in the Journal of the American Chemical Society, vol. 70, pp. 1104 to 1107, 1948.